(12) United States Patent
Numata

(10) Patent No.: US 9,985,939 B2
(45) Date of Patent: May 29, 2018

(54) SERVER SYSTEM, METHOD OF CONTROLLING SERVER SYSTEM, AND STORAGE MEDIUM, FOR PROVIDING A SERVICE BASED ON AUTHORIZATION INFORMATION

(71) Applicant: CANON KABUSHIKI KAISHA, Tokyo (JP)

(72) Inventor: Masahito Numata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 15/157,292

(22) Filed: May 17, 2016

(65) Prior Publication Data

US 2016/0352703 A1 Dec. 1, 2016

(30) Foreign Application Priority Data

May 29, 2015 (JP) .................................. 2015-110209

(51) Int. Cl.
*H04L 29/06* (2006.01)

(52) U.S. Cl.
CPC ............ *H04L 63/06* (2013.01); *H04L 63/102* (2013.01)

(58) Field of Classification Search
CPC ............................ H04L 63/0807; H04L 63/06
See application file for complete search history.

(56) References Cited

U.S. PATENT DOCUMENTS

| | | | |
|---|---|---|---|
| 7,206,936 B2* | 4/2007 | Aull .................... | G06Q 20/341 713/173 |
| 8,966,599 B1* | 2/2015 | Barrows ................ | H04L 63/08 705/37 |
| 9,684,783 B2* | 6/2017 | Hsu ......................... | G06F 21/45 |
| 2010/0281252 A1* | 11/2010 | Steeves ................ | H04L 9/3213 713/155 |
| 2014/0230020 A1* | 8/2014 | Mogaki ................... | H04L 63/10 726/4 |
| 2015/0135275 A1* | 5/2015 | Matsugashita ........ | H04L 63/104 726/4 |
| 2015/0326563 A1* | 11/2015 | Chan .................... | H04L 63/0823 713/172 |
| 2016/0119291 A1* | 4/2016 | Zollinger .............. | H04L 9/3228 713/171 |
| 2016/0119351 A1* | 4/2016 | Tamura .................. | H04L 63/10 726/4 |
| 2016/0134932 A1* | 5/2016 | Karp ................... | H04N 21/4431 348/155 |
| 2016/0269396 A1* | 9/2016 | Ren ....................... | H04W 12/06 |
| 2017/0012980 A1* | 1/2017 | Sanso ..................... | H04L 63/10 |
| 2018/0034800 A1* | 2/2018 | Pistauer ................ | H04L 63/083 |

FOREIGN PATENT DOCUMENTS

JP 2013033437 A 2/2013

* cited by examiner

*Primary Examiner* — Ali Shayanfar
(74) *Attorney, Agent, or Firm* — Canon U.S.A., Inc. IP Division

(57) ABSTRACT

In a case in which information about authorization that is identified based on an authorization token issued in an old authentication system satisfies a condition, the old authorization token is updated with a new authorization token.

10 Claims, 15 Drawing Sheets

FIG. 6

| CUSTOMER ID | Service Provider ID |
|---|---|
| CustomerA | ServiceProviderA |
| CustomerB | ServiceProviderB |

FIG. 11

| CUSTOMER ID | AUTHORIZATION TOKEN | REFRESH TOKEN | ISSUANCE OF OLD TOKEN |
|---|---|---|---|
| CustomerA | Didkyeau3i23fjkaij | adKku5f0cmxd | ISSUED |
| CustomerB | Dkjoikpkd84dijeaij | Hcieu21fcUdr30 | NOT ISSUED |

1101  1102  1103  1104

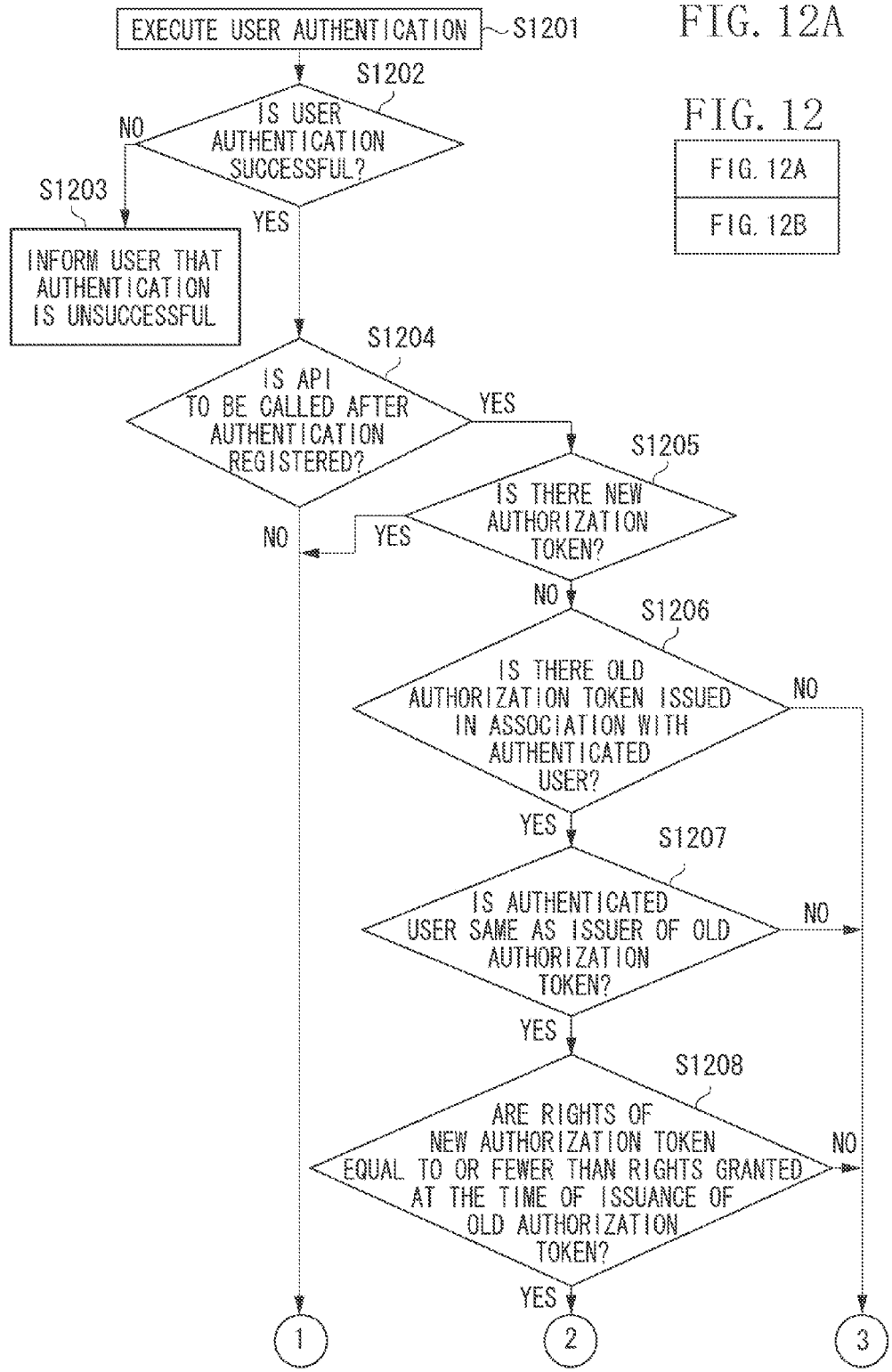

FIG. 13

| USER AUTHENTICATION | |
|---|---|
| USER ID | userA@test.com |
| PASSWORD | ************ |

AUTHENTICATE

SERVER SYSTEM, METHOD OF CONTROLLING SERVER SYSTEM, AND STORAGE MEDIUM, FOR PROVIDING A SERVICE BASED ON AUTHORIZATION INFORMATION

BACKGROUND OF THE INVENTION

Field of the Invention

The present invention relates to a server system configured to provide a service based on authorization information, a method of controlling a server system, and a storage medium.

Description of the Related Art

In recent years, as the cloud has become so popular, there are more opportunities to coordinate a plurality of services to create an added value. In a case of coordinating a plurality of services together, a mechanism is needed by which pieces of user information held by respective services and functions of the services can be coordinated securely and with ease.

In view of the foregoing situation, a standard protocol called Open Authorization (OAuth) has been developed that realizes authorization coordination. With OAuth, for example, an external service B authorized by a user can access data on the user that is managed by a service A. In this process, the service A specifies a scope of access of the external service B and then obtains explicit authorization of the user for the access of the external service B. The explicit authorization of the user will be referred to as "authorization operation".

By an authorization operation performed by the user, the external service B receives, from the service A, a token (hereinafter, "authorization token") that certifies that the service B is granted to access the service A, and subsequent access can be realized using the authorization token. Then, with the authorization token, the external service B can access the service A without user authentication information under the authority of the user having granted the authorization.

Further, Japanese Patent Application Laid-Open No. 2013-33437 discusses a method of using a printing service using an authentication token, which is an example of authorization information. Japanese Patent Application Laid-Open No. 2013-33437 also discusses a technique for renewing the expiration time of an authentication token at regular intervals so that the valid period of the authentication token does not expire before the printing is executed after the printing instruction.

SUMMARY OF THE INVENTION

According to an aspect of the present invention, a server system including a service provider capable of providing a predetermined service using an external service includes an issuing unit configured to issue authorization information in response to an authorization operation, which is performed by a user via an authorization confirmation screen displayed on a client, for granting the server system a right of the user with respect to the external service. The server system also includes a storing unit configured to store the authorization information, and a providing unit configured to provide the predetermined service using the external service without use of authentication information about the user, by using the authorization information stored by the storing unit. Further, the server system includes an updating unit configured to update, in a case where the authorization information stored by the storing unit is old authorization information issued in another server system that is different from the server system, the old authorization information with new authorization information according to a case in which information about authorization that is identified based on the old authorization information satisfies a condition.

Further features of the present invention will become apparent from the following description of exemplary embodiments with reference to the attached drawings.

BRIEF DESCRIPTION OF THE DRAWINGS

FIG. 6 is a diagram illustrating an example of a data configuration managed by an access right management unit.

FIG. 11 is a diagram illustrating an example of a data configuration managed by an authorization token management unit.

FIG. 13 is a diagram illustrating an example of an authentication screen.

DESCRIPTION OF THE EMBODIMENTS

In Japanese Patent Application Laid-Open No. 2013-33437, if an authentication server on which a service depends is changed to another system, authorization information issued in the old authentication system can no longer be used, so it becomes necessary to prompt the user to perform the authorization operation again. However, at is sometimes difficult to prompt the user to perform the authorization operation again when there is no change in a right to be granted by the user.

The present invention is directed to solving the foregoing problem and provides a new method for automatically updating an authorization token.

An exemplary embodiment of the invention will be described below with reference to the drawings.

Figure 1:
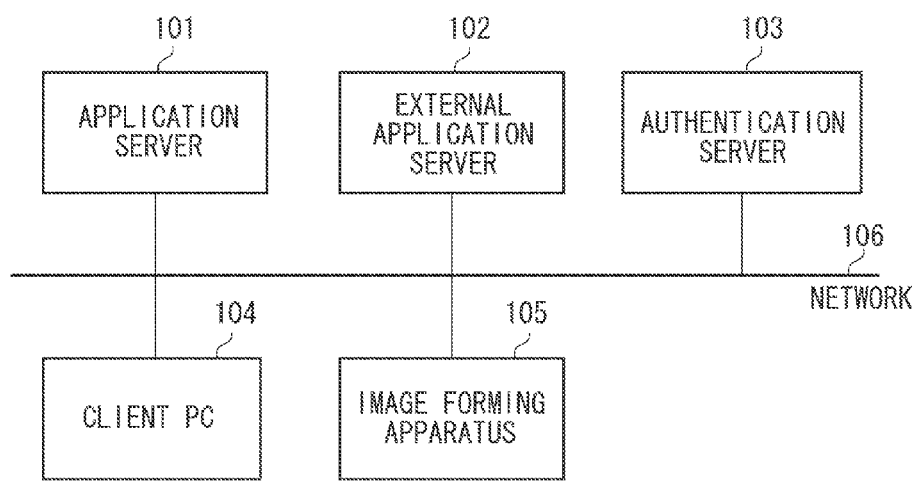
FIG. 1 is a diagram illustrating a network configuration.

The following describes apparatuses included in a system according to a first exemplary embodiment, with reference to FIG. 1. In FIG. 1, an application server 101, an external application server 102, an authentication server 103, a client personal computer (PC) 104, and an image forming apparatus 105 are connected to one another via a network 106.

The application server 101 is an information processing apparatus configured to provide a service to a user via the network 106. The external application server 102 is an information processing apparatus configured to provide an external service in response to a request from the client PC 104 or the application server 101 via the network 106. In the present exemplary embodiment, an apparatus that directly provides a service to the user will be referred to as the application server 101, and an apparatus that indirectly provides a service in coordination with the application server 101 will be referred to as the external application server 102. The system is not limited to the foregoing configuration, and it should be apparent to those skilled in the art that the external application server 102 may provide a service in coordination with an application on the client PC 104.

The authentication server 103 is an information processing apparatus configured to manage authentication information and authorization information about a predetermined user. While the external application server 102 and the authentication server 103 are described as separate apparatuses in the present exemplary embodiment, the functions of both of the external application server 102 and the authentication server 103 may be included in a single apparatus. Further, while each of the servers is described as a server including a single server in the present exemplary embodiment, each of the servers may include a plurality of servers, so for convenience each of the servers will be referred to as a server system. The term "server system" refers to a server including either a single server or a plurality of servers.

The client PC 104 is an information processing apparatus, such as a PC, a mobile terminal, and the like that is used at the time of using the service of the application server 101 via the network 106. The image forming apparatus 105 is an information processing terminal typified by a multi-function peripheral (MFP). While a service, in which the image forming apparatus 105 is used, provided by the application server 101 will be described below with reference to FIG. 2 in the present exemplary embodiment, the image forming apparatus 105 may be unnecessary depending on the service provided by the application server 101. The network 106 is a communication line for exchanging information between the apparatuses described above and may be in any form of the Internet and intranets and may be wired or wireless.

Figure 2:
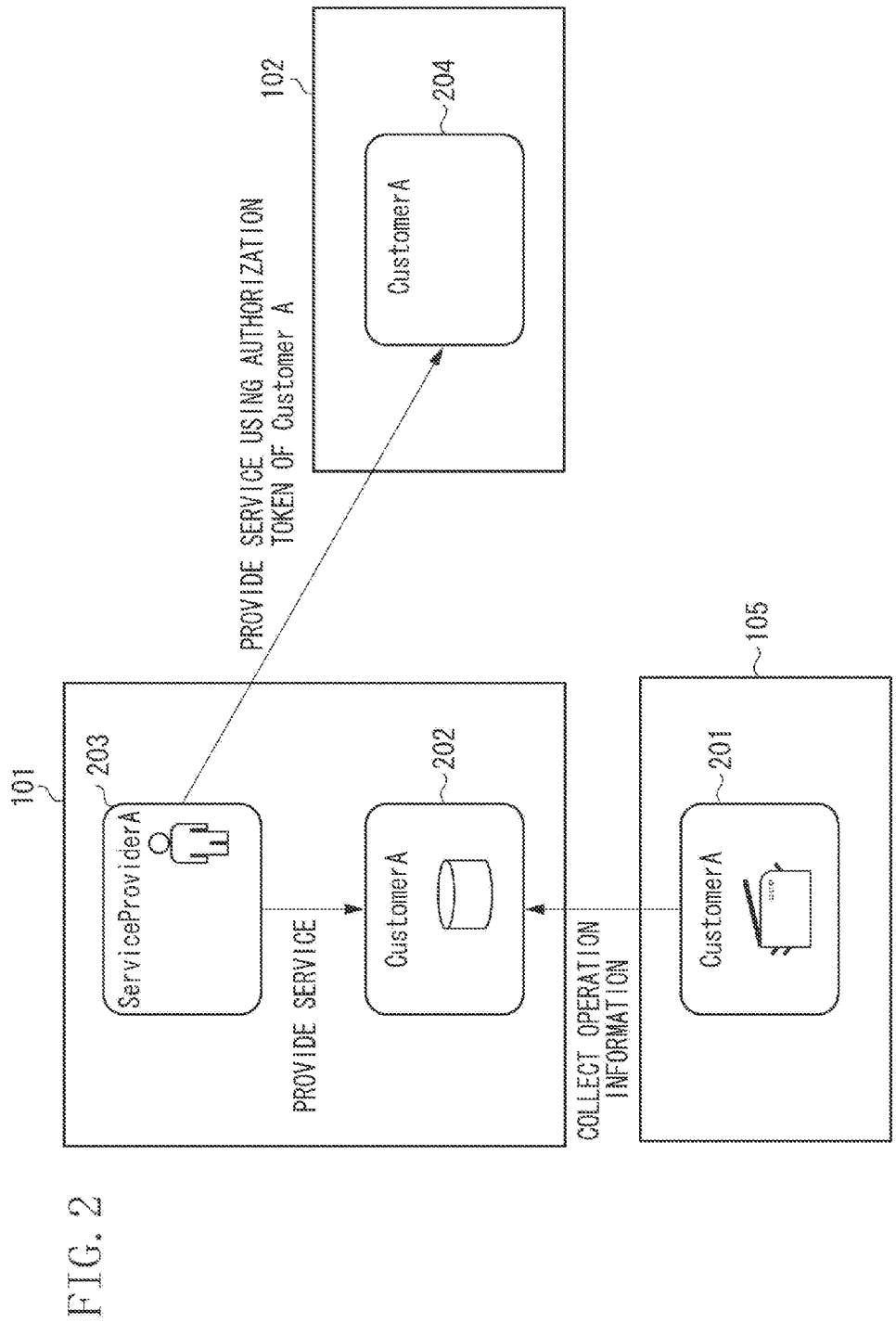
FIG. 2 is a diagram illustrating details of a service according to an exemplary embodiment.

FIG. 2 illustrates a service provided by the application server 101 according to the present exemplary embodiment. In the present exemplary embodiment, the management work of the image forming apparatus 105 of the customer is outsourced to a service provider and performed using the application server 101. The application server 101 collects operation information about an image forming apparatus 201 of the customer and manages the collected operation information in an area 202 managed for each customer. A service provider 203 accesses the customer operation information under appropriate access control and provides the management work of the image forming apparatus 201 as a service. There may be a case where the service provider 203 provides the service using a function provided by the external application server 102, which is different from the application server 101, or customer information 204. More specifically, the foregoing cases include an example where the management work is set according to a schedule of the customer that is registered in a calendar service and an example where a management report is generated using a customer template registered in a report service. In such cases, an authorized service provider transmits a request to the external application server 102 using an authorization token issued in advance by an authorization operation performed by a user of the customer.

In the present exemplary embodiment, a report service having a report generation function will be described as an example of the external application server 102. Saved authorization information is used so that the report service is used, without use of user authentication information that is required at the time of using the report service, and an outsourcing service is provided to the user. Further, in place of the user of the customer, another user managing the outsourcing service starts using the outsourcing service.

The representation format of the authorization token is not limited to those described in the exemplary embodiment, and the authorization token may be in any form of data that indicates that the right of the user of the customer is granted to the service (in the case of the present exemplary embodiment, the service corresponds to the report service). Such data including an authorization token will be referred to as authorization information. What should be noted here is that a user identification (ID) and/or a password that are/is input at the time of user authentication for the use of the service are/is not authorization information but authentication information, and the authorization information and the authentication information need to be recognized as completely different pieces of information.

In the case of the outsourcing service as illustrated in FIG. 2, the service provider desires to eliminate as much work of the user of the customer as possible. Thus, it is required to eliminate an operation of prompting the user of the customer to perform the authorization operation again due to a change in the authentication system although there is no change in a right to be granted by the customer.

The following describes the hardware configuration of the apparatuses included in the system.

Figure 3:
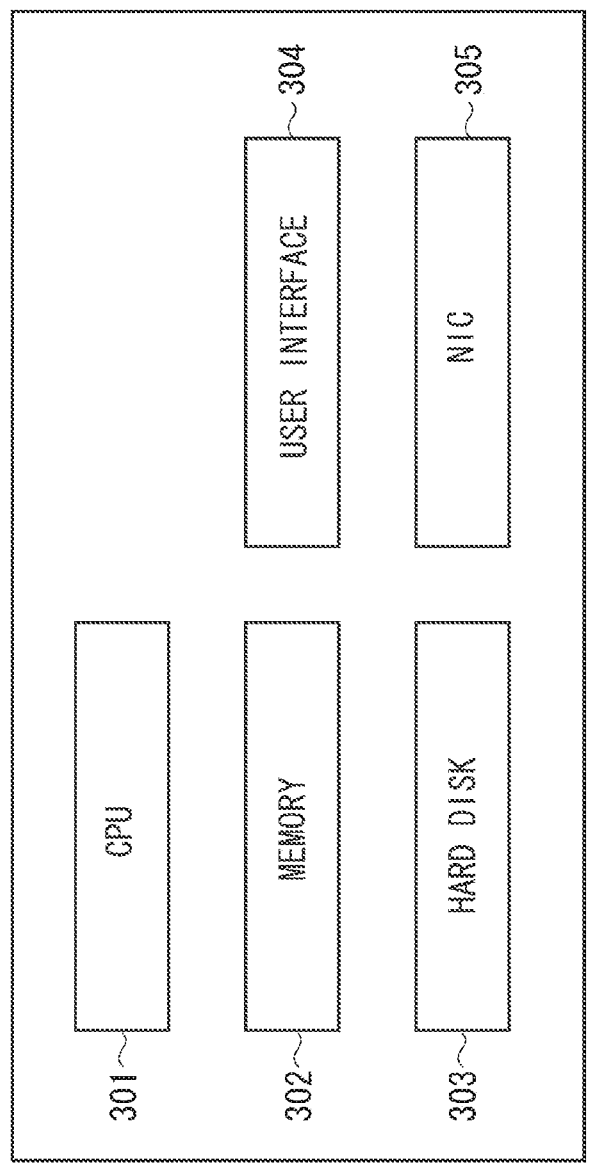
FIG. 3 is a diagram illustrating a hardware configuration of an information processing apparatus.

FIG. 3 illustrates the hardware configuration of the application server 101, the external application server 102, the authentication server 103, and the client PC 104. A central processing unit (CPU) 301 is a unit configured to execute various types of programs to realize various functions. A memory 302 is a unit configured to temporarily store various types of information, and a program stored in a hard disk 303 is loaded into the memory 302 and executed. Further, the memory 302 is a unit that is also used as a temporary work storage area of the CPU 301. The hard disk 303 is a unit configured to store various types of data and may be any other hardware having a similar function, such as a flash memory, and the like. A user interface 304 is a unit configured to receive a processing request from the user and output a screen to the user. A network interface card (NIC) 305 is a unit for connecting the application server 101 and the client PC 104 to a network, and the application server 101 and the client PC 104 can be connected to the network 106 using the NIC 305. It should be apparent to those skilled in the art that the hardware configuration illustrated in FIG. 3 is a representative hardware configuration and the hardware configuration is not limited to the hardware configuration illustrated in FIG. 3.

Figure 4:
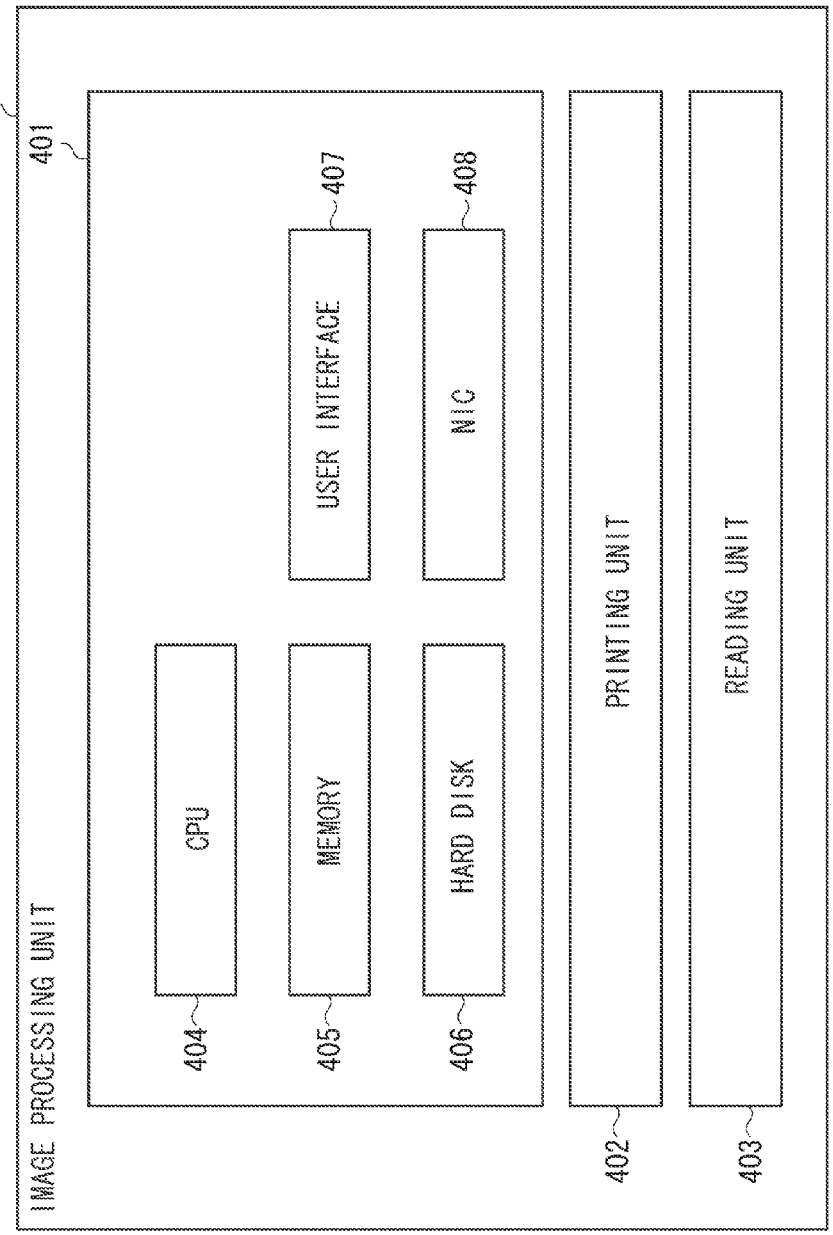
FIG. 4 is a diagram illustrating a hardware configuration of an image forming apparatus.

FIG. 4 illustrates the hardware configuration of the image forming apparatus 105. The image forming apparatus 105 includes an image processing unit 401, a printing unit 402, and a reading unit 403. In a case where the image forming apparatus 105 is not an MFP, the reading unit 403 may be omitted. The image processing unit 401 includes a CPU 404, a memory 405, a hard disk 406, and a user interface 407. The CPU 404 is a unit configured to execute various types of programs to realize various functions. The memory 405 is a unit configured to temporarily store various types of information, and a program stored in the hard disk 406 is loaded into the memory 405 and executed. Further, the memory 405 is a unit that is also used as a temporary work storage area of the CPU 404. The hard disk 406 is a unit configured to store various types of data and may be any other hardware having a similar function, such as a flash memory, etc. The user interface 407 is a unit configured to receive a processing request from the user and output a screen to the user. An NIC 408 is a unit for connecting the image forming apparatus 105 to the network 106. The hardware configuration illustrated in FIG. 2 is a representative hardware configuration of the image forming apparatus 105, and it should be apparent to those skilled in the art that the hardware configuration of the image forming apparatus 105 is not limited to the hardware configuration illustrated in FIG. 4. For example, a facsimile board and/or an external control apparatus may be connected.

The following describes the software configuration of each apparatus included in the system.

Figure 5:
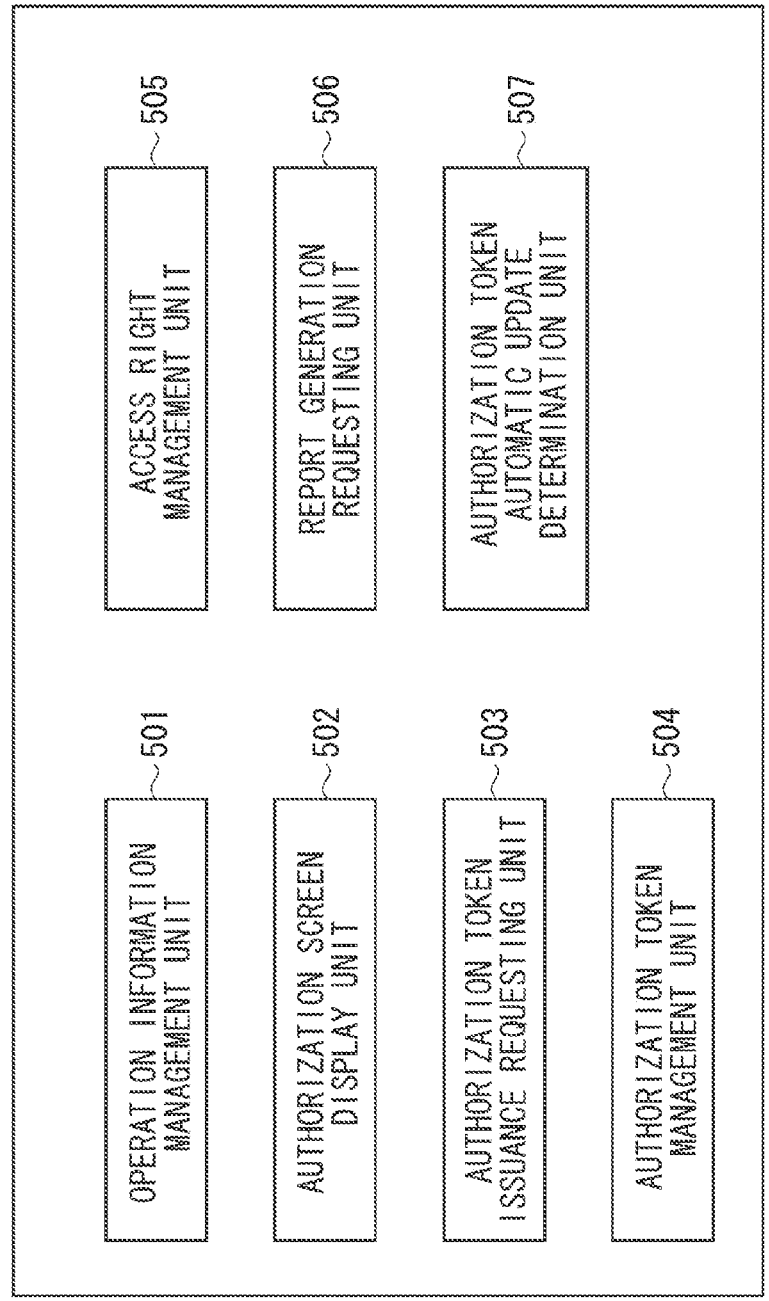
FIG. 5 is a diagram illustrating a software configuration of an application server.

FIG. 5 illustrates the software configuration of the application server 101. A program that realizes each function of the software configuration is stored in the hard disk 303, and the CPU 301 loads the program into the memory 302 and executes the program to realize the functions.

An operation information management unit 501 manages, for each customer owning the image forming apparatus 105, operation information received from the image forming apparatus 105. The operation information refers to information that is generated as a result of the use of the image forming apparatus 105, such as a job execution history, error occurrence information, operation information, consumables information, settings information, operation history, repair information, inquiry information, and the like, and it should be apparent to those skilled in the art that the operation information is not limited to specific information.

An authorization screen display unit 502 displays an access range on an authorization confirmation screen in order to receive, from the user of the customer, an authorization operation with respect to access to the external application server 102. An authorization token issuance requesting unit 503 requests the authentication server 103 to issue an authorization token at the time of reception of an authorization operation from the user of the customer. As to a method for the issuance of an authorization token, several methods are proposed in Open Authorization (OAuth). However, it should be apparent to those skilled in the art that the method for the issuance method is not particularly limited. An authorization token management unit 504 manages an issued authorization token for each customer. Further, in general, an authorization token is valid for a short time. Therefore, before the authorization token expires, the authorization token may be updated with a refresh token issued together at the time of the issuance of the authorization token.

An access right management unit 505 manages an access right such that when a service provider uses customer data managed in the area 202 or an issued authorization token, the service provider can access only a customer with which the service provider has a contractual relationship. FIG. 6 illustrates an example of a data configuration diagram managed by the access right management unit 505, and the access right management unit 505 manages service providers that are authorized to access customers. If a user of the service provider is authenticated by the application server 101, the access right management unit 505 obtains accessible customers based on information of the service provider to which the user belongs. The data configuration illustrated in FIG. 6 is a mere example, and it should be apparent to those skilled in the art that the data configuration is not limited to the data configuration illustrated in FIG. 6.

A report generation requesting unit 506 requests the external application server 102 to generate a report. When requesting the generation of a report, the report generation requesting unit 506 also requests data managed by the operation information management unit 501 and the authorization token of the user of the customer that is managed at the authorization token management unit 504. An authorization token automatic update determination unit 507 determines, in a case where the authentication server 101 having issued an authorization token is changed to a new authentication system, whether to reissue an authorization token in a new authentication system without an authorization operation by the user, as described below with reference to FIG. 12.

Figure 7:
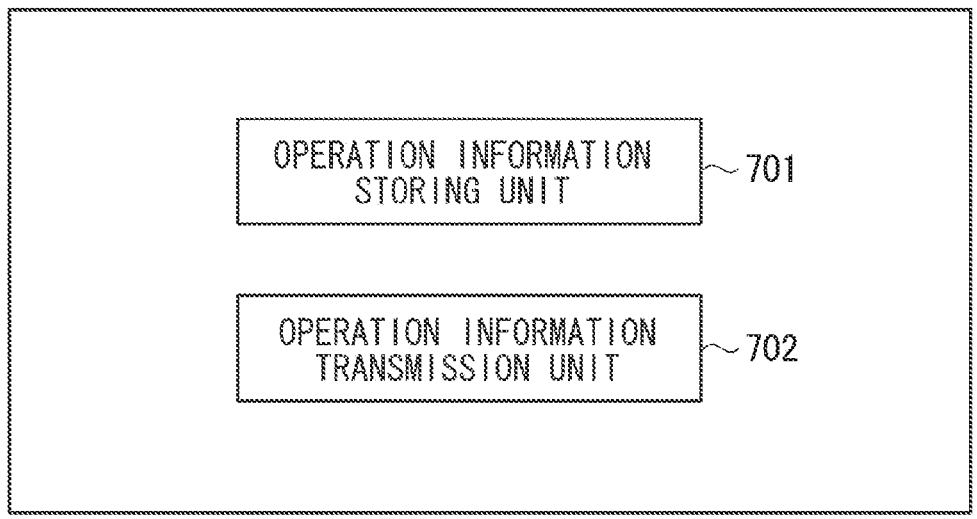
FIG. 7 is a diagram illustrating a software configuration of an image forming apparatus.

FIG. 7 illustrates the software configuration of the image forming apparatus 105. A program that realizes each function of the software configuration is stored in the hard disk 406, and the CPU 404 loads the program into the memory 405 and executes the program to realize the functions. An operation information storing unit 701 stores the operation information described above. An operation information transmission unit 702 transmits the stored operation information to the application server 101. Examples of a method for the transmission include a method in which the stored operation information is periodically transmitted, a method in which the stored operation information is promptly transmitted, a method in which the stored operation information is transmitted after a predetermined pieces or more of operation information is accumulated, and the like, and it should be apparent to those skilled in the art that the method is not particularly limited. Further, in a case where the image forming apparatus 105 does not include the operation information transmission unit 702, an information terminal apparatus (not illustrated) may collect operation information and transmit the collected operation information to the application server 101.

Figure 8:
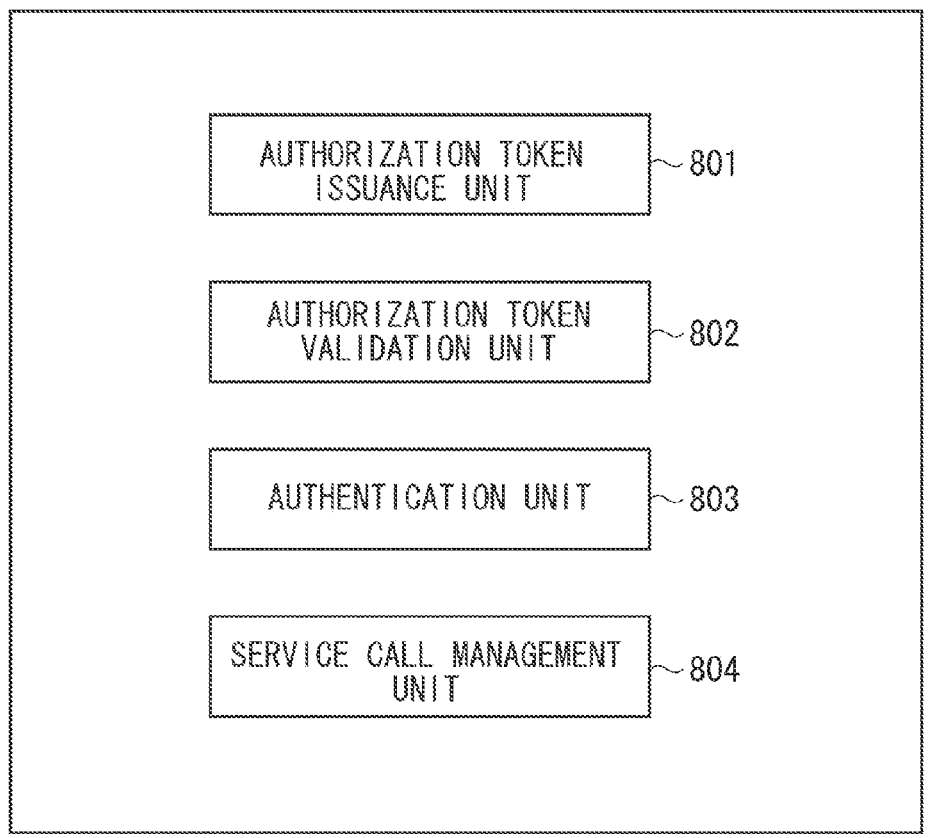
FIG. 8 is a diagram illustrating a software configuration of an authentication server.

FIG. 8 illustrates the software configuration of the authentication server 103. A program that realizes each function of the software configuration is stored in the hard disk 303, and the CPU 301 loads the program into the memory 302 and executes the program to realize the functions.

An authorization token issuance unit 801 validates an authorization token issuance request from the application server 101 and issues an authorization token. An authorization token validation unit 802 validates the validity of an authorization token in response to an authorization token validation request from the external application server 102. An authentication unit 803 authenticates a user who is to use the application server 101, using an authentication screen described below with reference to FIG. 13.

A service call management unit 804 is a unit for calling a pre-registered application program interface (API) after the authentication performed by the authentication unit 803. An API of the authorization token automatic update determination unit 507 of the application server 101 is registered in the service call management unit 804 so that whether to execute an automatic update of the authorization token can be determined immediately after the user authentication.

Figure 9:
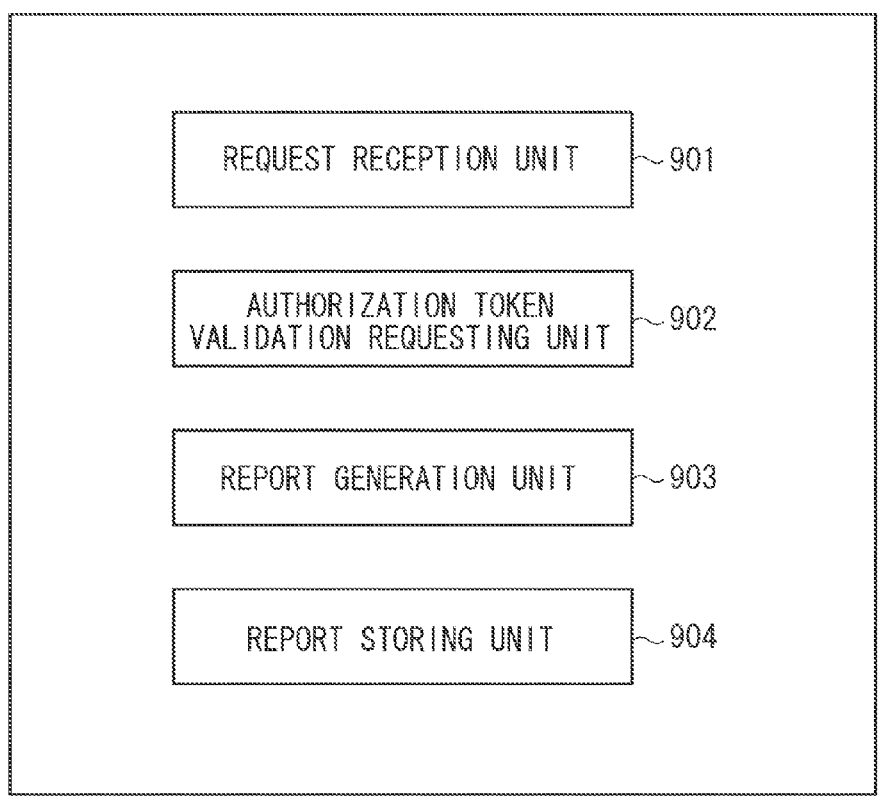
FIG. 9 is a diagram illustrating a software configuration of an external application server.

FIG. 9 illustrates the software configuration of the external application server 102. A program that realizes each function of the software configuration is stored in the hard disk 303, and the CPU 301 loads the program into the memory 302 and executes the program to realize the functions.

A request reception unit 901 receives a report generation request from the application server 101. An authorization token validation requesting unit 902 requests the authentication server 103 to validate whether an authorization token attached to a report generation request is valid and whether a necessary right is granted. If the authorization token is determined as a valid authorization token, a report generation unit 903 generates a report using data attached to the report generation request and returns the generated report to the application server 101. It should be apparent to those skilled in the art that the format of the report to be generated is not particularly limited and the report may be in any format, such as a portable document format (PDF), Word format, Hypertext Markup Language (HTML) format, and the like. A report storing unit 904 stores the uploaded report in the external application server 102.

Figure 10:
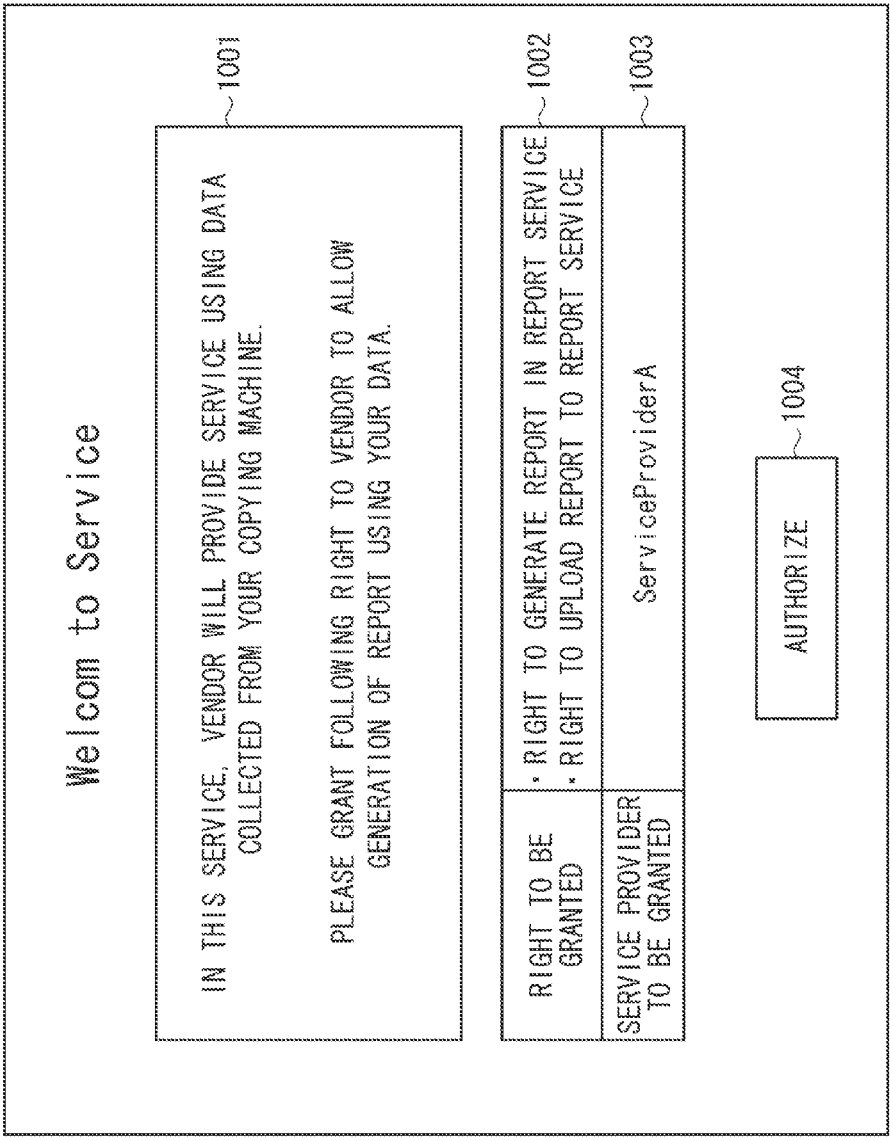
FIG. 10 is a diagram illustrating an example of a screen of an authorization screen display unit.

FIG. 10 illustrates an example of an authorization screen that is displayed by the authorization screen display unit 502 of the application server 101 when the user of the customer performs an authorization operation. A description display unit 1001 displays to the user of the customer the purpose of the grant of a right. A right display unit 1002 displays a right to be granted to the application server 101 by the user of the customer. A service-provider-to-grant display unit 1003 displays a service provider that is to use a right of the user of the customer that is granted. The authorization screen display unit 502 displays the authorization screen using the data managed by the access right management unit 505 as described above with reference to FIG. 6.

An authorize button 1004 is a button with which the user of the customer agrees with the displayed contents and provides authorization. At the press of the authorize button 1004, the authorization token issuance requesting unit 503 requests issuance of an authorization token with the rights displayed on the right display unit 1002. Further, the user of the service provider displayed in the service-provider-to-grant display unit 1003 uses the issued authorization token by using the access right management unit 505. Further, it should be apparent to those skilled in the art that the contents displayed on the authorization screen and operations are not limited to the contents and operations described above.

In response to an instruction to agree from the user, that is, an authorization operation performed by the user, the right of the user of the customer in the external application server 102 is granted to the application server 101, and the issued authorization token becomes identification information that indicates that the right is granted.

FIG. 11 illustrates an example of a data configuration diagram managed by the authorization token management unit 504 of the application server 101, and the issued authorization tokens are managed for each customer. A customer ID 1101 is information that uniquely indicates the customer, and in the present exemplary embodiment, the authorization tokens are managed for each customer. It should be apparent to those skilled in the art that the authorization token management unit is not limited to the customer.

An authorization token 1102 stores an authorization token issued from the authentication server 103. In the present exemplary embodiment, an authorization token is issued in the form of a string of text. A refresh token 1103 stores a refresh token issued by the authentication server 103 concurrently with the issuance of the authorization token. When the authorization token expires, the application server 101 can acquire an authorization token with an extended expiration time by using the refresh token.

An old authorization token issuance flag 1104 is a flag that indicates whether an authorization token is issued by the user of the customer when the authentication server 103 on which the application server 101 depends is an old authentication system. When the authentication system on which the application server 101 depends is changed, the old authorization token issuance flag 1104 with respect to the customer for which an authorization token is already issued in the old authentication system is set to "issued". An old authorization token is a type of old authorization information. It should be apparent to those skilled in the art that the data configuration is not limited to the data configuration described above. For example, the old authorization token issuance flag 1104 does not have to be in the form of a flag and may be in any form from which whether a token is already issued in the old authentication system can be determined.

Figure 12B:
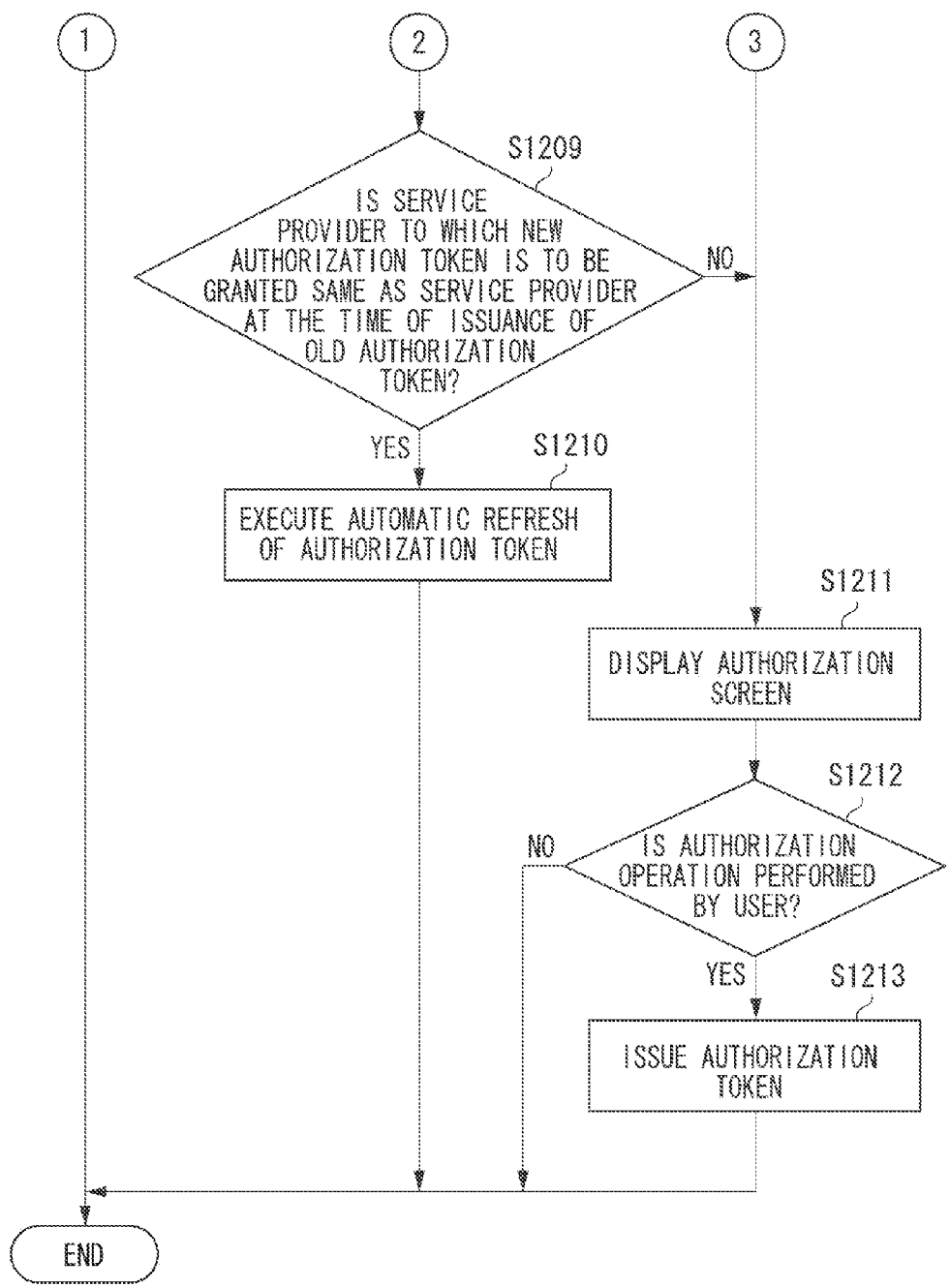
FIG. 12 (consisting of FIGS. 12A and 12B) is a flow chart illustrating a process for determination of automatic update of an authorization token.

FIG. 12 (consisting of FIGS. 12A and 12B) is a flow chart illustrating the processing performed by the authorization token automatic update determination unit 507 of the application server 101 to determine whether to issue an authorization token in a new system without requiring the user to perform an authorization operation again in the case where the authentication server 103 is changed to the new system. The following process is stored in one of the storing units, which are the memory 302 and the hard disk 303, in the software configurations of the application server 101 and the authentication server 103 in FIGS. 5 and 8 and is executed by the CPU 301.

In step S1201, the authentication unit 803 of the authentication server 103 displays on the client PC 104 of the user of the customer the authentication screen illustrated in FIG. 13. The authentication unit 803 executes user authentication using authentication information about the user of the customer that is input to the authentication screen. In step S1202, if the user authentication is unsuccessful (NO in step S1202), then in step S1203, the authentication unit 803 of the authentication server 103 informs the user that the authentication is unsuccessful. On the other hand, in step S1202, if the user authentication is successful (YES in step S1202), then in step S1204, the service call management unit 804 of the authentication server 103 determines whether an API to be called after the authentication is registered. If the API is registered (YES in step S1204), the service call management unit 804 calls the API. In the present exemplary embodiment, the API of the authorization token automatic update determination unit 507 of the application server 101 is called. Further, in another method for calling the API of the authorization token automatic update determination unit 507, a uniform resource locator (URL) of the authorization token automatic update determination unit 507 may be specified as a destination of a redirect in a URL of the authentication screen. In the case where the authorization token automatic update determination unit 507 is specified as the destination of the redirect, the URL of the authorization token automatic update determination unit 507 is called by a function of a web browser, so the authentication server 103 does not have to include the service call management unit 804.

In step S1205, the authorization token automatic update determination unit 507 of the application server 101 determines, by using the authorization token management unit 504 described above with reference to FIG. 11, whether there is an authorization token issued in the new authentication system in association with the authenticated user of the customer. If an authorization token is already issued in the new authentication system in step S1205, and after step S1210, and step S1212 described below, the processing is ended without execution of subsequent determination processing by the authorization token automatic update determination unit 507.

Next, in step S1206, the authorization token automatic update determination unit 507 of the application server 101 determines, by using the authorization token management unit 504 described above with reference to FIG. 11, whether there is an authorization token issued in the old authentication system in association with the authenticated user of the customer. If there is an authorization token (YES in step S1206), the authorization token is determined as a candidate for an automatic update.

Next, in step S1207, the authorization token automatic update determination unit 507 determines whether the authenticated user of the customer is the same as the issuer of the old authorization token. If the authenticated user of the customer is the same as the issuer of the old authorization token (YES in step S1207), the old authorization token is determined as a candidate for an automatic update. In the present exemplary embodiment, the determination is conducted based on whether there is a special role of the user of the customer that is necessary to issue an authorization token, such as an administrative right of the customer. In another method, information that identifies the user who is the issuer of the old authorization token may be recorded in FIG. 11 as well as the information about whether an old authorization token is issued, and the determination may be performed based on whether the user who is the issuer is the same as the authenticated user of the customer. By the processing in step S1207, whether the authenticated user of the customer is the same as the user who performed the authorization operation in the old authentication system is checked at the time of an automatic update.

Next, in step S1208, the authorization token automatic update determination unit 507 determines whether rights of the authorization token to be issued in the new authentication system are equal to or fewer than rights granted at the time of the issuance of the old authorization token. If the rights of the authorization token to be issued in the new authentication system are equal to or fewer than the rights granted at the time of the issuance of the old authorization token (YES in step S1208), the authorization token is determined as a candidate for an automatic update. The phrase "the rights the authorization token to be issued in the new authentication system are equal to or fewer than the rights granted at the time of the issuance of the old authorization token" indicates that the rights of the authorization token to be issued in the new authentication system are narrower than the scope of rights granted by the user as specified by the old authorization token. The following describes specific examples. In a case where the rights that the application server 101 needs with respect to the external application server 102 do not change even when the authentication system is changed, it is determined that the rights are the same based on the existence of the old authorization token. Further, in a case where the application server 101 needs fewer rights with respect to the external application server 102, it is determined that the rights to be needed are within the scope of access already granted by the user of the customer, and the authorization token is determined as a candidate for an automatic update. Examples include a case where only the right to generate a report is to be needed in the new system while both the right to generate a report and the right to store the report are needed in the old authentication system, and the like. Further, in a case where the rights that are needed are different in each customer, not only the information about whether an old authorization token is issued but also the granted rights may be recorded in FIG. 11, and then the granted rights may be compared with the rights to be issued in the new system. By the processing in step S1208, it is checked that an authorization token having the rights exceeding the rights granted in the old authentication system is not to be automatically updated, at the time of the automatic update.

Next, step S1209, the authorization token automatic update determination unit 507 determines whether the service provider to which the authorization token issued in the new authentication system is to be granted is the same as the service provider at the time of issuance of the old authorization token. If the service provider is the same (YES in step S1209), the authorization token is determined as a candidate for an automatic update. In a case where the access relationship between the service provider and the customer does not change although the authentication system is changed, it is determined that the service provider to which the right(s) is to be granted is the same based on the existence of the old authorization token. Further, in a case where the access relationship changes, not only the information about whether an old authorization token is issued but also the authorized service provider to which the right(s) is to be granted may be recorded in FIG. 11, and then the recorded service provider may be compared with the service provider to which the right(s) is to be granted in the new system. By the processing in step S1209, it is checked that an authorization token that can be used by a service provider other than the service provider that is authorized in the old authentication system and to which the right(s) is to be granted is not to be automatically updated.

Figure 14:
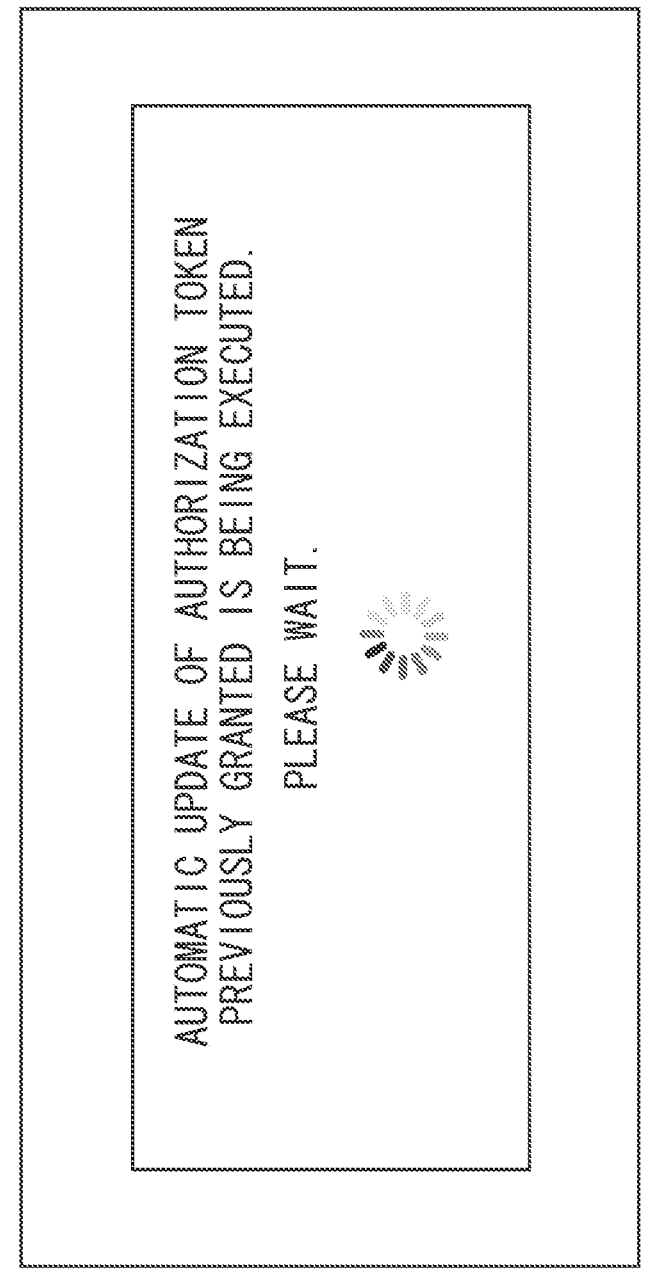
FIG. 14 is a diagram illustrating an example of a screen for automatic update of an authorization token.

If the authorization token automatic update determination unit 507 determines the authorization token as a candidate for an automatic update in every one of steps S1206 to S1209 (YES in steps S1206 to S1209), then in step S1210, the authorization token issuance requesting unit 503 issues an authorization token in the new authentication system by using the rights of the authenticated user. In this process, not the authorization screen illustrated in FIG. 10 but the authorization token automatic update screen illustrated in FIG. 14 is displayed, and an update is automatically executed. The update processing according to the present exemplary embodiment is the processing to discard the old authorization token from the memory and then store the new authorization token.

On the other hand, if the authorization token automatic update determination unit 507 does not determine the authorization token as a candidate for an automatic update in any of steps S1206 to S1209 (NO in any of steps S1206 to S1209), then in step S1211, the authorization screen display unit 502 displays the authorization screen illustrated in FIG. 10. In step S1212, if an authorization operation is performed by the user (YES in step S1212), then in step S1213, the authorization token issuance requesting unit 503 issues an authorization token in the new authentication system by using the rights of the customer user. In this process, the authorization screen display unit 502 may display on the authorization screen only a portion that is different from the authorization screen with which an authorization operation has been previously performed, based on the condition from which it is determined that the authorization token is not a candidate for an automatic update.

By the foregoing processing, even when the authentication system is changed, if the rights to be needed are within the scope of rights granted in the old authentication system, an authorization token can be issued in the new authentication system without an operation which is required for the user to check the authorization screen and to perform an authorization operation. On the other hand, if the rights to be needed are beyond the scope of rights granted in the old authentication system, the authorization screen is displayed so that an authorization token can be issued using rights that are explicitly granted by the user. It should be apparent to those skilled in the art that the method of determining the states described in respective steps S1206 to S1209 is not limited to the method described above. Specifically, an automatic update may be executed based on at least one determination step, and the order of the determination steps is not particularly limited. For example, the determination of step S1207 may be performed prior to the determination of step S1206.

Further, instead of including step S1205 in which determination of whether a new authorization token exists, the application server 101 may delete the registration of a customer to whom an authorization token is issued in the new authentication system from the service call management unit 804 of the authentication server 103. In this way, the authorization token automatic update determination unit 507 does not have to perform the determination processing for the customer to whom the authorization token has been issued in the new authentication system at the time of the user authentication, whereby the performance of the user authentication improves.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Mu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110209, filed May 29, 2015, which is hereby incorporated reference herein its entirety.

What is claimed is:

1. A server system including a service provider configured to provide a predetermined service using an external service, the server system comprising:
one or more processors; and
one or more memories storing instructions that, when executed by the one or more processors, cause the server system to perform operations comprising:
issuing authorization information in response to an authorization operation, which is performed by a user via an authorization confirmation screen displayed on a client, for granting the server system a right of the user with respect to the external service;
storing the authorization information;
providing the predetermined service using the external service without use of authentication information about the user, by using the authorization information stored by the storing unit; and
updating, in a case where the authorization information stored by the storing unit is old authorization information issued in another server system that is different from the server system, the old authorization information with new authorization information according to a case in which information about authorization that is identified based on the old authorization information satisfies a condition,
wherein the condition is whether a first state is indicated, the first state being a state in which an issuer of the old authorization information that is identified based on the old authorization information is the same as an authenticated user.

2. The server system according to claim 1, wherein the condition is whether a second state is indicated, the second state being a state in which a scope of a granted right specified by the old authorization information that is identified based on the old authorization information is equal to or narrower than a scope of a granted right specified by the new authorization information.

3. The server system according to claim 1, wherein the condition is whether a third state is indicated, the third state being a state in which a target, to which a right is granted, specified by the old authorization information that is identified based on the old authorization information is the same as a target to which a right is to be granted that is specified by the new authorization information.

4. The server system according to claim 1, wherein the condition includes a plurality of conditions, and wherein the updating is configured to check at least any one of the plurality of conditions, and according to a case in which each of the checked conditions is satisfied, the updating updates the old authorization information with the new authorization information.

5. The server system according to claim 1, wherein according to a case in which the information about authorization that is identified based on the old authorization information satisfies the condition, without displaying of the authorization confirmation screen on the client by the issuing, the updating causes the issuing to issue authorization information and updates the old authorization information with the new authorization information based on the issued authorization information.

6. The server system according to claim 1, wherein according to a case in which the information about authorization that is identified based on the old authorization information does not satisfy the condition, the issuing displays the authorization confirmation screen on the client, and according to a case in which the authorization operation is performed again by the user, the updating updates the old authorization information with the new authorization information based on the authorization information issued by the issuing.

7. The server system according to claim 1, wherein the updating refers to processing which causes the storing to discard the old authorization information and store the new authorization information instead.

8. The server system according to claim 1, wherein while the updating is being performed, an update screen indicating that an automatic update of the old authorization information with the new authorization information is being executed is displayed on the client.

9. A method of controlling a server system including a service provider configured to provide a predetermined service using an external service, the method comprising:

issuing authorization information in response to an authorization operation, which is performed by a user via an authorization confirmation screen displayed on a client, for granting the server system a right of the user with respect to the external service;

storing the authorization information;

providing the predetermined service using the external service without use of authentication information about the user, by using the stored authorization information; and updating, in a case where the stored authorization information is old authorization information issued in another server system that is different from the server system, the old authorization information with new authorization information according to a case in which information about authorization that is identified based on the old authorization information satisfies a condition, wherein the condition is whether a first state is indicated, the first state being a state in which an issuer of the old authorization information that is identified based on the old authorization information is the same as an authenticated user.

10. A non-transitory computer readable storage medium storing a program that controls a server system including a service provider configured to provide a predetermined service using an external service, the program causing the server system to perform a process, the process comprising:

issuing authorization information in response to an authorization operation, which is performed by a user via an authorization confirmation screen displayed on a client, for granting the server system a right of the user with respect to the external service; storing the authorization information;

providing the predetermined service using the external service without use of authentication information about the user, by using the stored authorization information; and updating, in a case where the stored authorization information is old authorization information issued in another server system that is different from the server system, the old authorization information with new authorization information according to a case in which information about authorization that is identified based on the old authorization information satisfies a condition, wherein the condition is whether a first state is indicated, the first state being a state in which an issuer of the old authorization information that is identified based on the old authorization information is the same as an authenticated user.

* * * * *